(12) United States Patent
Lombard et al.

(10) Patent No.: US 12,475,031 B2
(45) Date of Patent: Nov. 18, 2025

(54) VERY LARGE ADDRESS SPACE USING EXTENDED PAGE TABLES

(71) Applicant: Samsung Electronics Co., Ltd., Suwon-si (KR)

(72) Inventors: David Lombard, Los Alamitos, CA (US); Robert Wisniewski, Ossining, NY (US); Douglas Joseph, Leander, TX (US); Matthew Wolf, Oak Ridge, TN (US); Jai Dayal, Aloha, OR (US); James Loo, Brentwood, CA (US); Andrew Thomas Tauferner, Rochester, MN (US); Rolf Riesen, Forest Grove, OR (US)

(73) Assignee: Samsung Electronics Co., Ltd., Yongin-si (KR)

( * ) Notice: Subject to any disclaimer, the term of this patent is extended or adjusted under 35 U.S.C. 154(b) by 82 days.

(21) Appl. No.: 18/593,435

(22) Filed: Mar. 1, 2024

(65) Prior Publication Data
US 2024/0311289 A1   Sep. 19, 2024

Related U.S. Application Data

(60) Provisional application No. 63/452,078, filed on Mar. 14, 2023.

(51) Int. Cl.
G06F 12/02      (2006.01)
G06F 12/1027    (2016.01)

(52) U.S. Cl.
CPC ........ *G06F 12/023* (2013.01); *G06F 12/1027* (2013.01)

(58) Field of Classification Search
CPC .............. G06F 12/023; G06F 12/1009; G06F 12/1027; G06F 2212/1044; G06F 2212/657
See application file for complete search history.

(56) References Cited

U.S. PATENT DOCUMENTS

| | | | |
|---|---|---|---|
| 6,922,766 B2 | 7/2005 | Scott | |
| 6,925,547 B2 | 8/2005 | Scott et al. | |
| 8,301,717 B2 | 10/2012 | Deshpande | |
| 8,874,681 B2 | 10/2014 | Aho et al. | |
| 9,858,201 B2 | 1/2018 | Koob et al. | |
| 10,817,441 B2 | 10/2020 | Kumar et al. | |

(Continued)

FOREIGN PATENT DOCUMENTS

WO    WO 2023/098032 A1    6/2023

*Primary Examiner* — Aracelis Ruiz
(74) *Attorney, Agent, or Firm* — Lewis Roca Rothgerber Christie LLP

(57) ABSTRACT

A method to address memory in nodes of a distributed memory system includes partitioning the memory in each node into one or more memory blocks available for a global memory pool. The method also includes combining, in response to a request to address memory in the global memory pool, a global bit from a global page table with a physical address to generate a global virtual address. The global bit indicates whether the memory is local or remote. The method also includes translating, using global access tuple (GAT) tables, the global virtual address to a global physical address, and addressing a memory block in the global memory pool based on the global physical address.

20 Claims, 6 Drawing Sheets

(56) References Cited

U.S. PATENT DOCUMENTS

| | | | |
|---|---|---|---|
| 2002/0087795 A1* | 7/2002 | Hum | G06F 12/1063 |
| | | | 711/E12.064 |
| 2003/0070057 A1* | 4/2003 | Kakeda | G06F 12/1036 |
| | | | 711/E12.068 |
| 2005/0005074 A1* | 1/2005 | Landin | G06F 12/1072 |
| | | | 711/E12.027 |
| 2009/0089537 A1* | 4/2009 | Vick | G06F 12/0284 |
| | | | 711/E12.09 |
| 2021/0406199 A1 | 12/2021 | Kounavis et al. | |
| 2023/0393970 A1* | 12/2023 | Hornung | G06F 12/1036 |

* cited by examiner

VERY LARGE ADDRESS SPACE USING EXTENDED PAGE TABLES

CROSS-REFERENCE TO RELATED APPLICATION(S)

The present application claims priority to and the benefit of U.S. Provisional Application No. 63/452,078, filed Mar. 14, 2023, the entire content of which is incorporated herein by reference.

BACKGROUND

1. Field

The present application relates to systems and methods for addressing memory in a distributed memory system, or memory systems comprising multiple nodes.

2. Description of the Related Art

A computer cluster includes a number of nodes that are connected together. In a large multi-node cluster (e.g., a supercomputer) with significant memory per node, the sum of total system memory may exceed the ability of existing memory management hardware to effectively address or access. For example, the system memory may exceed the number of address bits available to the memory management unit. Furthermore, the network connecting the individual nodes is designed to transmit messages, not executing load/store instructions to access memory in other nodes. Accordingly, conventional memory management hardware is not able to address all of the memory in large multi-node supercomputers.

The above information disclosed in this Background section is only for enhancement of understanding of the background of the invention and therefore it may contain information that does not constitute prior art.

SUMMARY

The present disclosure relates to various embodiments of a method to address memory in nodes of a distributed memory system and make it accessible using standard load/store operations or a bulk data transfer mechanism. In one embodiment, the method includes partitioning the memory in each node into one or more memory blocks available for a global memory pool. The method also includes combining, in response to a request to address memory in the global memory pool, a global bit from a global page table with a physical address to generate a global virtual address. The global bit indicates whether the memory is local or remote. The method also includes translating, using global access tuple (GAT) tables, the global virtual address to a global physical address, and addressing a memory block in the global memory pool based on the global physical address.

The method may also include translating a virtual address to the physical address utilizing a global page table or a translation lookaside buffer (TLB).

The global page table may include a field indicating that the physical address is to be combined with the global bit.

Each of the one or more memory blocks in the nodes may be a fixed size.

Each of the one or more memory blocks in the nodes may be block-size aligned.

A total of the memory in the distributed memory system may exceed a number of physical address bits that can be generated by a common page table mechanism.

The global bit may be cached.

The global bit may specify a remote node identification and a block offset.

The global bit may also specify upper address bits.

The method may also include interleaving global virtual addresses.

The method may also include removing the global bit before addressing the memory block.

The present disclosure also relates to various embodiments of a distributed memory system. In one embodiment, the distributed memory system includes a number of nodes each including memory and an operating system running on the memory. The memory of each node is partitioned into one or more memory blocks available for a global memory pool. The operating system includes instructions which, when executed, cause the operating system to combine, in response to a request to address memory in the global memory pool, a global bit stored in a hardware device with a physical address to generate a global virtual address. The global bit indicates whether the memory is local or remote. The instructions also cause the operating system to translate, using global access tuple (GAT) tables, the global virtual address to a global physical address, and address a memory block of the one or more memory blocks in the global memory pool based on the global physical address.

The instructions may further cause the operating system to translate a virtual address to the physical address utilizing a global page table or a translation lookaside buffer (TLB).

Each of the one or more memory blocks in the nodes may be a fixed size.

Each of the one or more memory blocks in the nodes may be block-size aligned.

A total of the memory in the distributed memory system may exceed a number of physical address bits that can be generated by a common page table mechanism.

The global bit may specify a remote node identification and a block offset.

The global bit may also specify upper address bits.

The instructions may further cause the operating system to interleave global virtual addresses.

The instructions may further cause the operating system to remove the global bit before addressing the memory block.

This summary is provided to introduce a selection of concepts that are further described below in the detailed description. This summary is not intended to identify key or essential features of the claimed subject matter, nor is it intended to be used in limiting the scope of the claimed subject matter. One or more of the described features and/or tasks may be combined with one or more other described features and/or tasks to provide a workable system and/or a workable method.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 4:
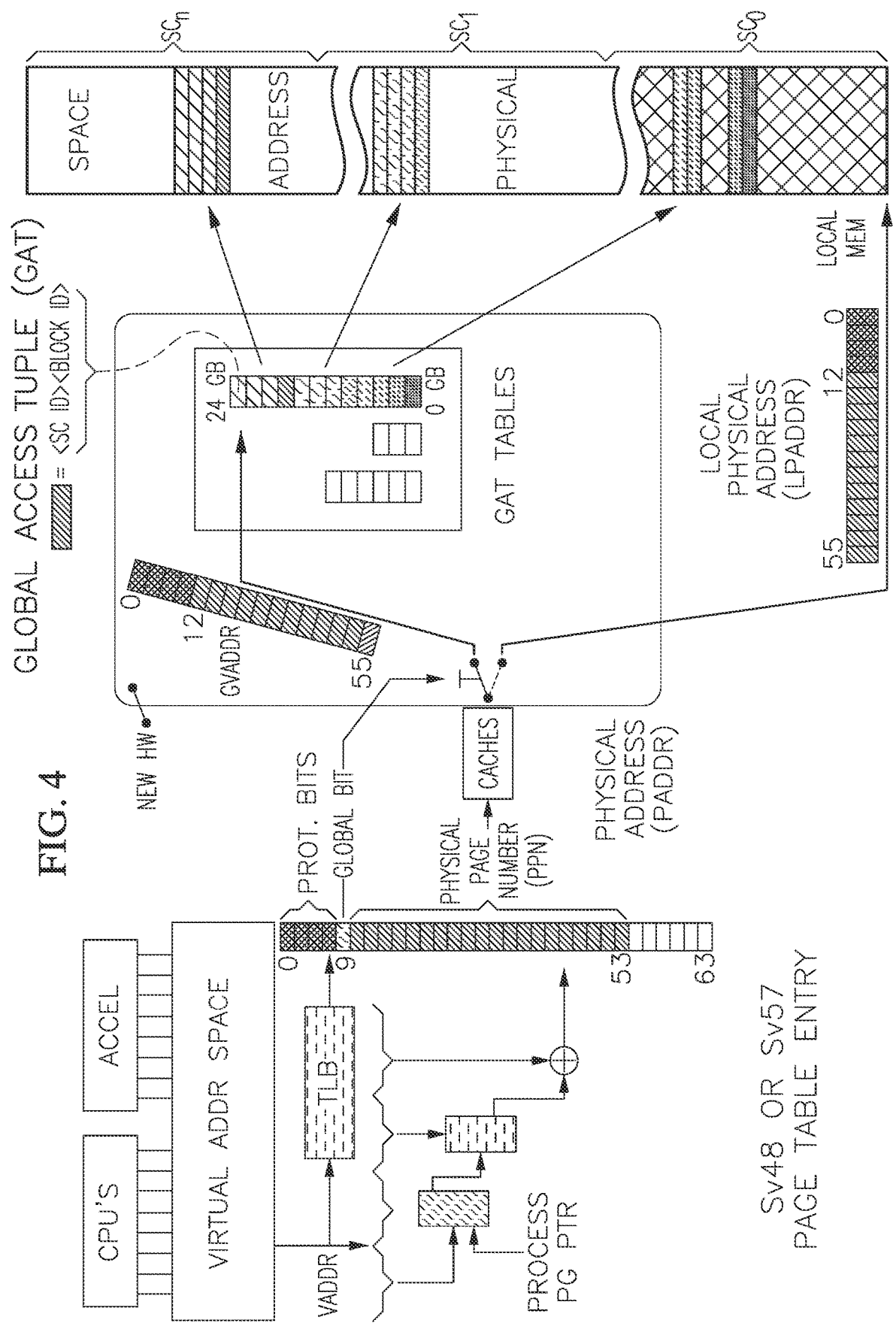
FIG. 4 is a schematic diagram depicting the translation of a global virtual address (GVADDR) to a global physical address utilizing global access tuple (GAT) tables according to one embodiment of the present disclosure.
Figure 5:
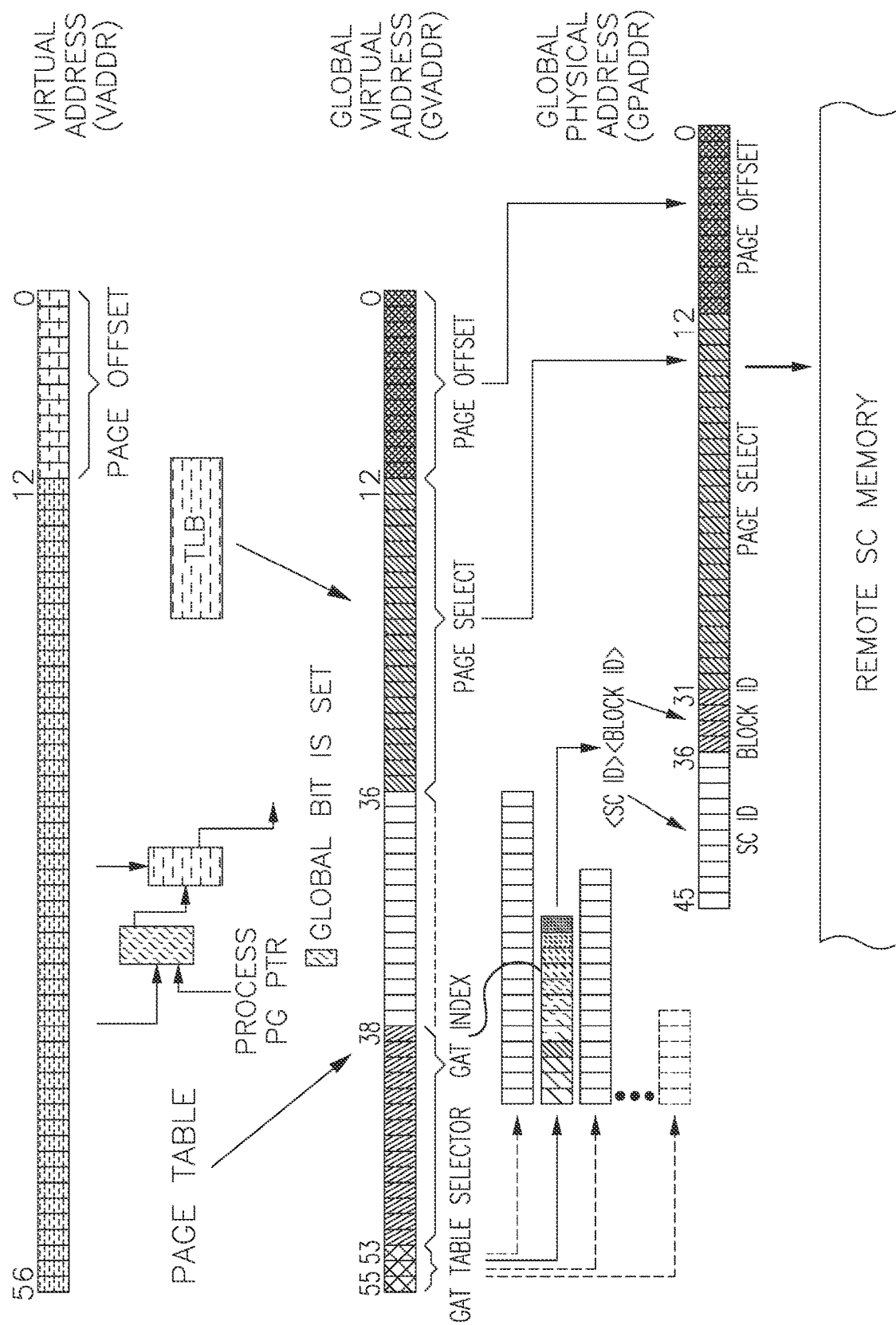
FIG. 5 is a schematic diagram depicting translation of the virtual address (VADDR) to the global virtual address (GVADDR) and translation of the GVADDR to the global physical address (GPADDR) according to one embodiment of the present disclosure.

The present disclosure relates to various methods of addressing memory in a distributed memory system in which the total amount of memory, in combination with the number of nodes holding that memory, exceeds the number of physical address bits that can be generated by a common page table mechanism. In one or more embodiments, the system and method includes (i) partitioning the memory in each of the nodes into one or more memory blocks available for a global memory pool; (ii) generating a global virtual address by combining a physical address with a "global bit" stored in a hardware device that indicates whether the memory is local or remote; (iii) translating the global virtual address to a global physical address using global access tuple (GAT) tables; and (iv) addressing a memory block in the global memory pool based on the global physical address. The global physical address includes the destination node ID, the remote block ID to be referenced, the page to be selected within the block, and the page offset, as shown in FIGS. 4 and 5. In this manner, remote memory in a distributed memory system may be addressed using ordinary instructions (e.g., load/store), even when the total amount of memory in the distributed memory system exceeds the number of physical address bits that can be generated by a common page table mechanism.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

Figure 1:
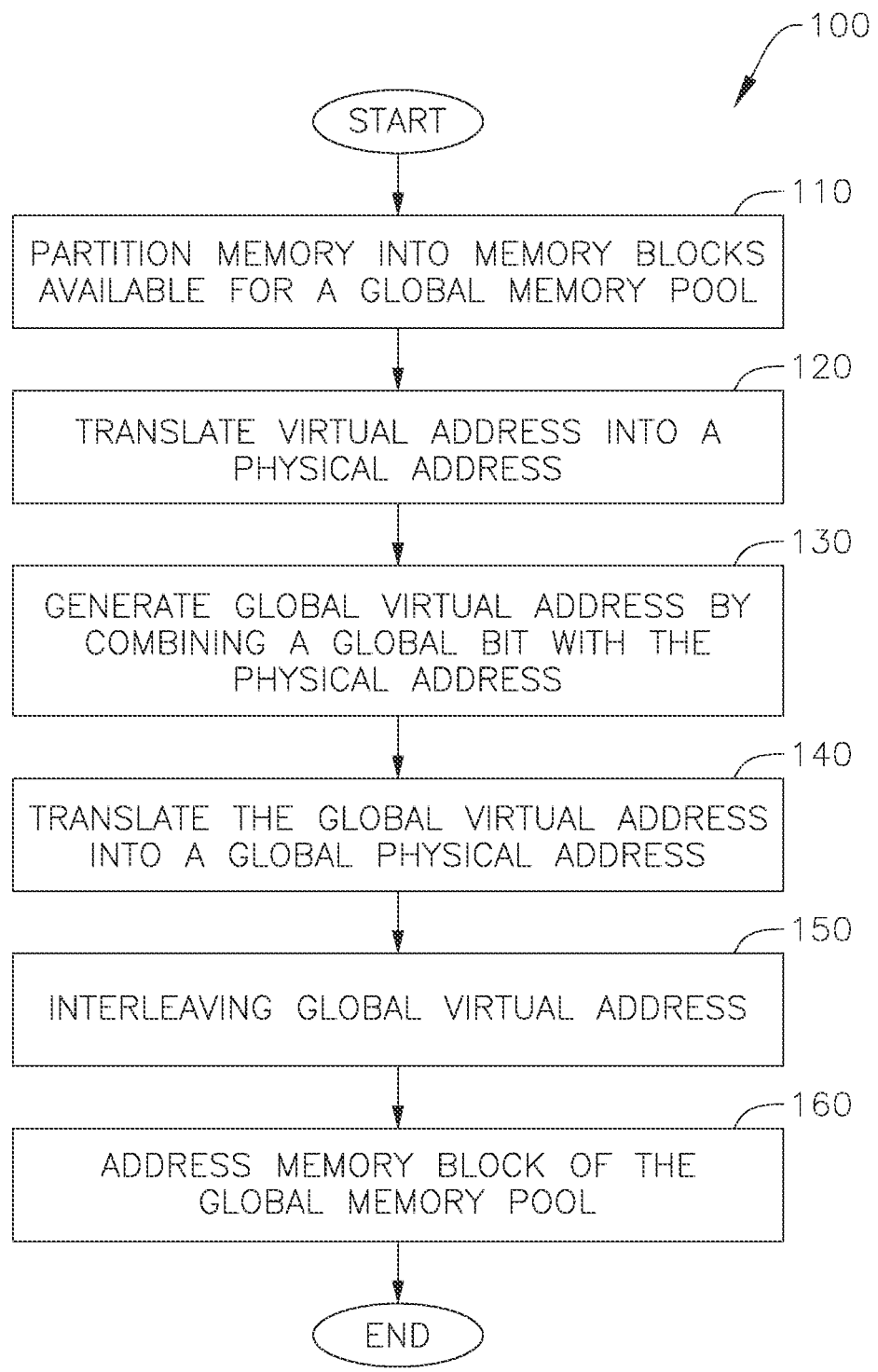
FIG. 1 is flowchart illustrating tasks of a method of addressing memory in a distributed memory system according to one embodiment of the present disclosure.

FIG. 1 is a flowchart illustrating tasks of a method 100 of addressing memory in a distributed memory system according to one embodiment of the present disclosure. The distributed memory system includes a plurality of nodes each having memory and an operating system running in the memory. In the illustrated embodiment, the method 100 includes a task 110 of partitioning the memory in each of the nodes to have one or more memory blocks available for a global memory pool (i.e., the memory of each of the nodes in the distributed memory system are partitioned into one or more memory blocks, and together the selected partitioned memory blocks form a global memory pool that is accessible for read/write operations by each of the nodes in the distributed memory system that have been granted appropriate access). In one or more embodiments, the task 110 may include dynamically allocating the memory blocks at runtime utilizing the malloc( ) or calloc( ) library functions, or priviledged OS functions such as kmalloc( ) in the Linux kernel.

Figure 2:
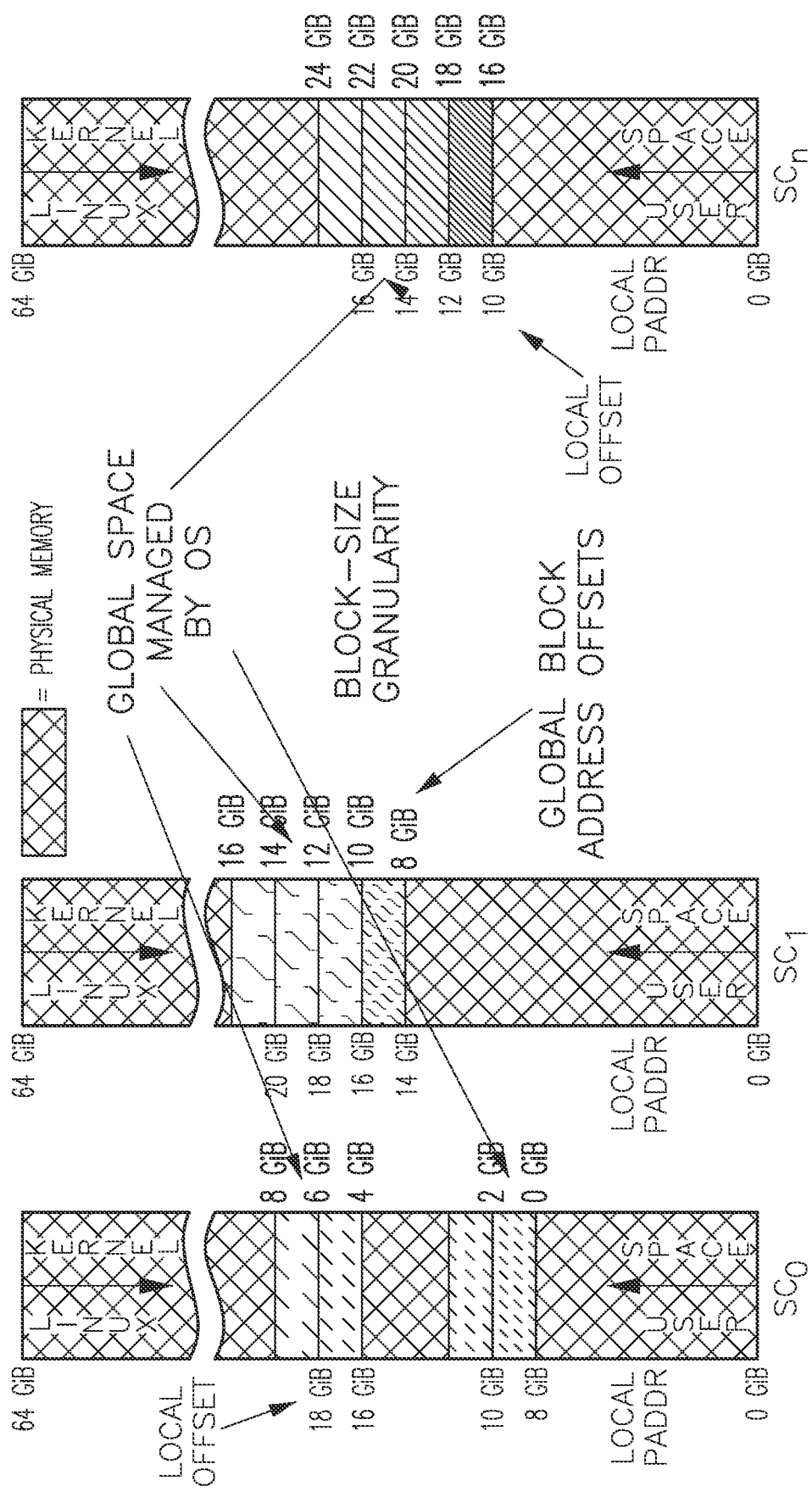
FIG. 2 is a schematic diagram of a plurality of nodes each having their memory partitioned into one or more memory blocks that are available for a global memory pool according to one embodiment of the present disclosure.

FIG. 2 is a schematic diagram depicting the memory of each of a plurality of nodes (e.g., nodes $SC_0$, $SC_1$ . . . . $SC_n$, where n is the number of nodes in a given system) being partitioned into one or more memory blocks for the global memory pool. In one or more embodiments, the size of the memory blocks is fixed (e.g., 2 GB) and the memory blocks are block-size aligned (e.g., 2 GB aligned). Additionally, in one or more embodiments, the memory blocks may be conceptually numbered 0 through n, where n=(node memory size/memory block size)−1. Memory blocks having the aforementioned properties (e.g., fixed size, block-size aligned, and conceptually numbered) are configured to increase the simplicity, efficiency, and scalability of the system and method.

In one or more embodiments, the installed physical memory in each of the nodes (e.g., $SC_0$, $SC_1$ . . . . $SC_n$) is conceptually partitioned into equally sized blocks and the memory blocks are sequentially numbered. Accordingly, in one or more embodiments in which the blocks within each node are sequentially numbered, each tuple of <SC ID><Block ID>uniquely identifies a specific area in physical memory of a specific node $SC_n$. During an initiating process, read or write access to memory is granted by inserting the relevant <SC ID><Block ID>tuple into the global access tuple (GAT) table. Once the relevant <SC ID><Block ID>tuple is established in the GAT table and a page table entry is created that points to the GAT table, the initiating process can then access (read/write) all memory within that block. FIG. 2 is a schematic view depicting the block numbers that overlay a given physical address region of the nodes $SC_0$, $SC_1$, and $SC_n$. FIG. 2 depicts an embodiment in which four memory blocks each in three nodes $SC_0$, $SC_1$, and $SC_n$ are enabled for remote access (reading and/or writing). In one or more embodiments, the method 100 may be utilized to access any other suitable number of memory blocks in any other number of nodes. In one or more embodiments, all other areas of the physical memory (i.e., the memory blocks that are not part of the global memory pool) are protected and inaccessible from the other nodes SCs. Due to the fixed size of the memory blocks, the sequential numbering scheme of the memory blocks, and the predetermined position of potential regions of remote access, initiator side hardware may be utilized to perform bit shift and bit logical operations for address calculation and management.

With continued reference to FIG. 1, in response to a read/write request from a user-level program to address memory in the global memory pool, the method 100 also includes a task 120 of translating a virtual address (virtual address space) used by the user-level program to a physical address (physical address space) used by the random-access memory of the system. In one or more embodiments, the task 120 of translating the virtual address to the physical address may utilize a page table (i.e., the task 120 includes utilizing a mapping between the virtual addresses and the physical addresses in a page table to translate a virtual address to a physical address). In one or more embodiments, the task 120 of translating the virtual address to the physical address may utilize a translation lookaside buffer (TLB), which is a cache of recently used mappings from the page table. In one or more embodiments, the task 120 of translating the virtual address to the physical address may include searching the TLB first. If a match is found (i.e., a TLB hit), the virtual address is translated to the virtual address using the mapping in the TLB. If a match is not found in the TLB (i.e., a TLB miss), the virtual address is translated to the virtual address using the mapping in the page table. In one or more embodiments, the page table may have a Sv48 format (for 48-bit virtual addresses) or a Sv57 format (for 57-bit virtual addresses). In one or more embodiments, task 120 may be the same as or similar to a procedure utilized in a modern CPU that supports virtual memory addresses, except that the physical address bits in the page table may be interpreted differently when they are used to address global memory.

With continued reference to FIG. 1, the method 100 also includes a task 130 of generating a global virtual address (GVADDR) from the physical address (PADDR) in response to the global bit being set. The global bit indicates whether the memory address is local or remote (i.e., the global bit is utilized to distinguish between a local node and remote nodes and is utilized to route an address for local or remote address handling). The global bit may be cached and visible to hardware (e.g., on the address bus or a dedicated line). In one or more embodiments, the page table, which is utilized to generate the physical address from the virtual address, includes a field (a global bit) that indicates whether or not the physical address entries in the page table will need to be translated into a global virtual address (GVADDR). In one or more embodiments, the global virtual address (GVADDR) includes a global access tuple (GAT) table selector, a GAT index, a page select, and a page offset.

Figure 3:
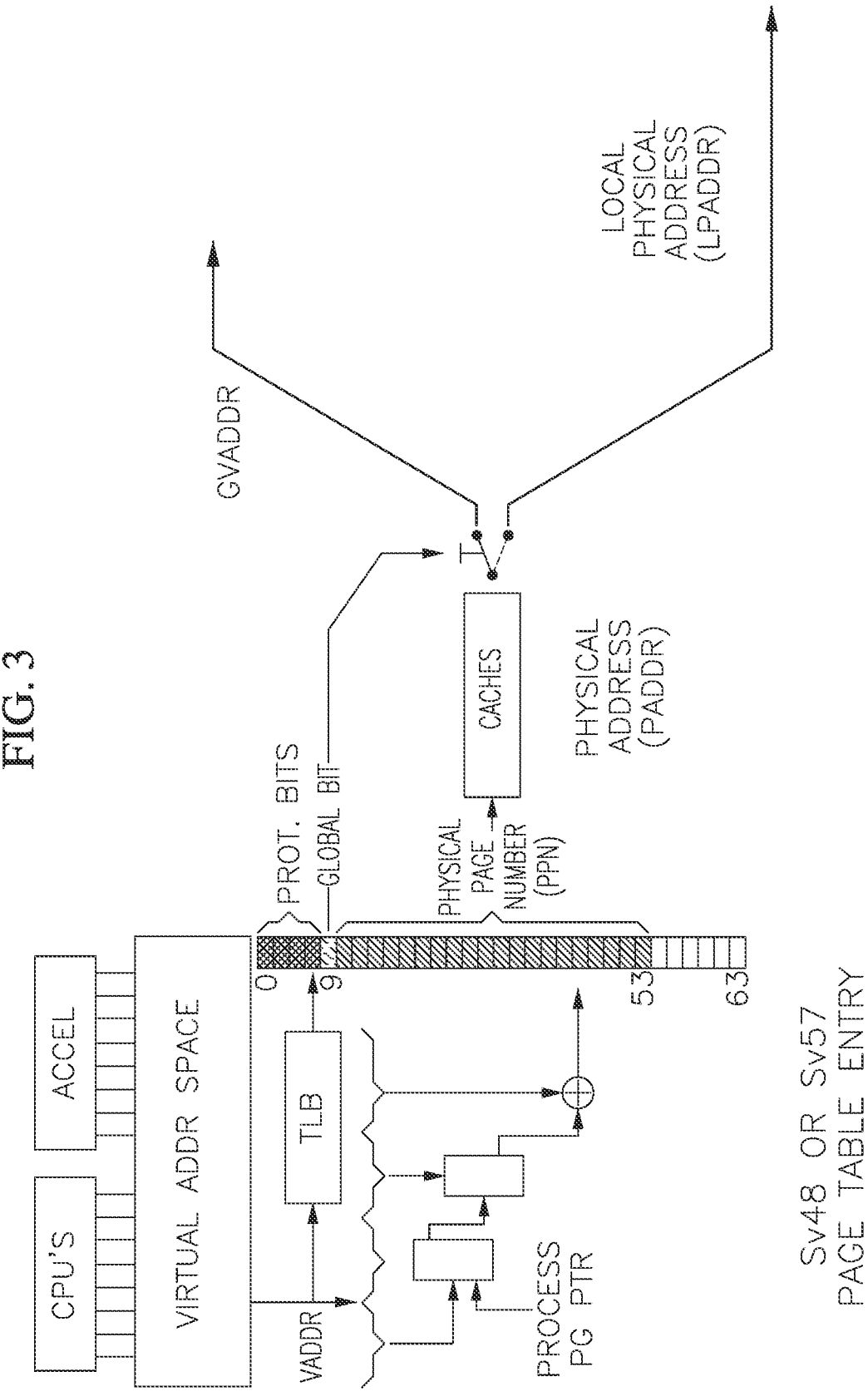
FIG. 3 is a schematic diagram depicting the generation of a global virtual address (GVADDR) by combining a physical address (PADDR) with a global bit from a page table that indicates whether the memory to be addressed by the load/write request is local or remote according to one embodiment of the present disclosure.

FIG. 3 is a schematic diagram depicting the generation of a local physical address (LPADDR) in response to the global bit from the page table indicating that the memory to be addressed by the load/write request is local. If the global bit from the page table indicates that the memory to be addressed by the load/write request is local, a local physical address (LPADDR) is generated from the physical address (PADDR) using the standard process of a page table lookup, possibly combined with a Translation Lookaside Buffer (TLB) lookup of a previously cached translation.

With continued reference to FIG. 1, the method 100 also includes a task 140 of translating the global virtual address (GVADDR) obtained in task 130 to a global physical address (GPADDR) using global access tuple (GAT) tables. The GAT tables contain a mapping from the global virtual address (GVADDR) to a global physical address (GPADDR). The GAT tables are part of the process state, just like the page table. In the task 140, the GAT tables specify the remote node identification (SC ID) and the block offset (block ID) within the remote memory block (e.g., $SC_0$, $SC_1 \ldots SC_n$). In one or more embodiments, the GAT tables may utilize a TLB mechanism for caching previously computed mappings. In one or more embodiments, the task 140 of generating the global physical address (GPADDR) from the global virtual address (GVADDR) includes combining the SC ID and the Block ID stored in the GAT table with the physical address stored in the page table to generate the global virtual address (GVADDR) in response to the global bit being set (i.e., the task 140 includes generating a global physical address (GPADDR) by combining the physical page number (PPN) stored in the page table (FIG. 3) and the SC ID and Block ID stored in the GAT table (FIG. 4) in response to the global bit(s) indicating that the address to be accessed is remote). That is, in one or more embodiments, the task 140 includes generating the global physical address (GPADDR) by combining the SC ID and the Block ID stored in the GAT table with the physical address stored in the page table in response to the global bit in the page table indicating that the physical address is remote and therefore needs to be combined with the SC ID and the Block ID in order to create a valid address at the remote node SC. Additionally, in one or more embodiments, a field in the page table contains an index into a remote physical address generator (labeled "NEW HW" in FIG. 4) to select which string of bits need to be added to the generated physical address. As used herein, the remote physical address generator is a switch activated by the global bit(s) and the GAT tables. In one or more embodiments, in response to the global bit(s) indicating that the physical address to be accessed is remote, the remote physical address generator combines the SC ID and the block ID from a tuple in one of the GAT tables with the page select bits from the same entry in the corresponding page table and the lower bits of the virtual address to create a fully formed global physical address (GPADDR) that is valid at the remote node SC. In one or more embodiments, the remote physical address generator may, optionally, also combine some of the upper address bits of the physical memory in the remote node SC.

FIG. 4 is a schematic diagram depicting tasks 130 and 140, namely, generation of a global virtual address (GVADDR) and generation of a global physical address (GPADDR) from the global virtual address (GVADDR) in response to the global bit indicating that the memory to be addressed is on a remote node SC. As illustrated in FIG. 4, the global virtual address (GVADDR) is translated to a global physical address (GPADDR) utilizing global access tuple (GAT) tables of the remote physical address generator (labeled "New HW" in FIG. 4) (i.e., in response to the global bit indicating that the memory to be addressed is on a remote node SC, the remote physical address generator translates the global virtual address (GVADDR) to the global physical address (GPADDR) using the SC ID and the Block ID in the GAT table(s)). In this manner, the global bit uses a level of indirection to access local memory with a local physical address (LPADDR) (as shown in FIG. 3) or to access remote memory from the global memory pool with a global virtual address (GVADDR) and a global physical address (GPADDR) (as shown in FIG. 4). A GVADDR may also reference a local memory location if the SC ID matches the local node ID. This is a slower path than using a LPADDR to access local memory, but it may make programming easier in some embodiments. In one or more embodiments, the method may include a fast path for global addresses that lead to local memory, without going first through the network and setting the destination to the local node ID.

FIG. 5 is a bit level view of the process depicted in FIG. 4 (i.e., FIG. 5 is a schematic diagram depicting the task 130 of translating the virtual address (VADDR) to the global virtual address (GVADDR) and the task 140 of translating the GVADDR to the global physical address (GPADDR) according to one embodiment of the present disclosure). As illustrated in FIG. 5, the virtual address (VADDR) includes a virtual page number (i.e., the physical page numbers in the page table) and a page offset (e.g., a 12-bit offset). Additionally, as illustrated in FIG. 5, the global virtual address (GVADDR) includes a page offset, a page select, a global access tuple (GAT) table selector, and a GAT index, and the global physical address (GPADDR) includes the page offset, the page select, a remote node identification (SC ID), and a block offset (block ID). That is, FIG. 5 is a bit level view of tasks 130 and 140 in which the remaining bits from the page table entry, the virtual address, the SC ID, and the block ID from the tuple are all combined into the global physical address (GPADDR) that is sent to the remote node SC.

With continued reference to FIG. 1, the method 100 may include a task 150 of interleaving global virtual addresses to distribute memory accesses among multiple nodes SC and blocks within those nodes SCs, rather than accessing the physical memory within the memory blocks of a global region. Interleaving global virtual addresses may be desired to exploit multiple available hardware channels to other nodes, which increases bandwidth and reduces congestion by utilizing parallel paths. That is, distributing memory accesses among multiple nodes SC and blocks within those nodes SCs may alleviate bottlenecks that would otherwise occur when many initiators use the same hardware paths to reach a common target (i.e., a specific memory block within a specific node SC). In one or more embodiments, the method 100 may not include the task 150 of interleaving global virtual addresses.

Figure 6:
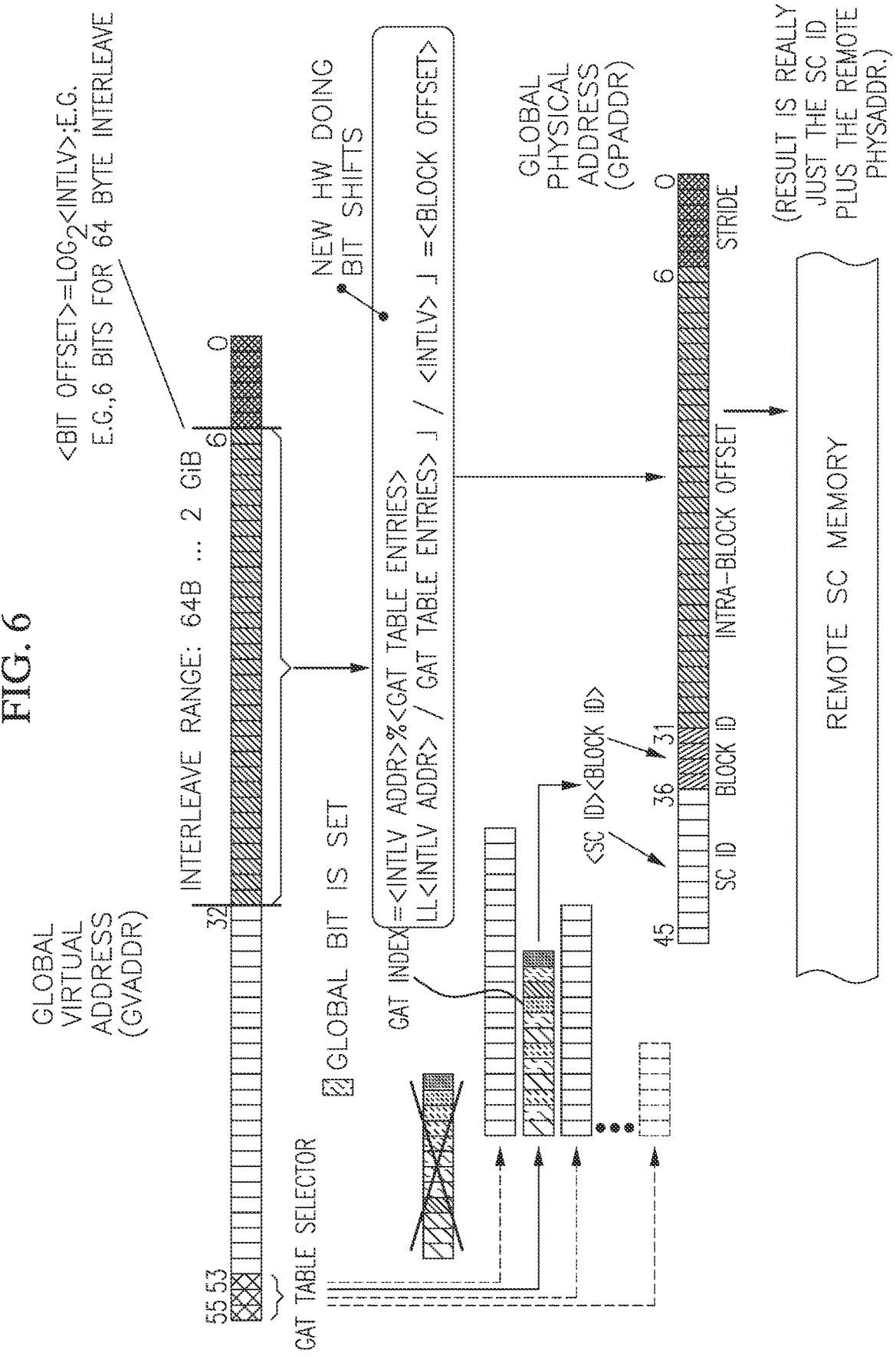
FIG. 6 is a schematic diagram depicting interleaving of the global virtual address (GVADDR) according to one embodiment of the present disclosure.

FIG. 6 is a schematic diagram depicting interleaving of the global virtual address (GVADDR) according to one embodiment of the present disclosure. As illustrated in FIG. 6, the global virtual address (GVADDR) includes a GAT table selector, an interleave range (e.g., 64 B to 2 GiB), and a bit offset (e.g., a log 2 interval, such as 6 bits for a 64 byte interleave). Additionally, as illustrated in FIG. 6, the global physical address (GPADDR) includes a remote node identification (SC ID), a block offset (block ID), an intra-block offset, and a stride.

In one or more embodiments, the task 150 of interleaving the nodes SCs includes changing the interpretation of the bits in the page table. Instead of specifying a page selector and a page offset, as depicted in FIG. 5, hardware (labeled "NEW HW" in FIG. 6) uses the page table bits to compute a GAT table index and a block offset. This computation allows for the interleaving among nodes SCs. In one or more embodiments, the task 150 may include interleaving the memory blocks in the nodes SCs. In one or more embodiments, the task 150 of interleaving the memory blocks may include changing (e.g., shuffling) the order of the GAT table entries. In FIG. 6, the linear GAT table (which is not utilized in this task 150) is crossed out and the interleaved GAT table (which is utilized in this task 150) is depicted below the linear GAT table. After the order of the GAT table entries has been changed, the SC ID and the block ID from the GAT table may then be combined with the computed block offset to form the global physical address (GPADDR). The computations carried out in FIG. 6 to obtain the GAT index and the block offset are power of 2 operations that can be performed in hardware using bit shift operations.

With reference again to FIG. 1, the method 100 also includes a task 160 of addressing a memory block of the one or more memory blocks in the global memory pool (i.e., addressing the memory of one of the nodes) based on the global physical address (GPADDR) obtained in task 140. In one or more embodiments, the global bit may be removed after the request has been routed to the appropriate node in the system. Accordingly, in one or more embodiments, by the time the actual load/store occurs on the remote node, only the physical address (valid for that node) remains. For load requests, the source address of the originating node is utilized to send the requested data back to the originating node.

The tasks of the method of addressing memory in a distributed memory system according to various embodiments of the present disclosure may be performed by a processor executing computer-readable instructions stored in memory. The term "processor" is utilized herein to include any combination of hardware, firmware, memory and software, employed to process data or digital signals. The hardware of a processor may include, for example, a microcontroller, application specific integrated circuits (ASICs), general purpose or special purpose central processors (CPUs), digital signal processors (DSPs), graphics processors (GPUs), and programmable logic devices such as field programmable gate arrays (FPGAs). In a processor, as utilized herein, each function is performed either by hardware configured, i.e., hard-wired, to perform that function, or by more general-purpose hardware, such as a CPU, configured to execute instructions stored in non-transitory memory. A processor may contain two or more processors, for example, a processor may include two processors, an FPGA and a CPU, interconnected on a PCB. The memory may include flash memory, ferroelectric random-access memory (FeRAM), magnetoresistive random-access memory (MRAM), phase-change memory (PCM), FeFET memory, and/or resistive random-access memory (RRAM).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims.

What is claimed is:

1. A method to address memory in a plurality of nodes of a distributed memory system, the method comprising:
    partitioning the memory in each of the plurality of nodes into one or more memory blocks available for a global memory pool;
    combining, in response to a request to address memory in the global memory pool, a global bit stored in a hardware device with a physical address to generate a global virtual address, wherein the global bit indicates whether the memory is local or remote;
    translating, using global access tuple (GAT) tables, the global virtual address to a global physical address; and
    addressing a memory block of the one or more memory blocks in the global memory pool based on the global physical address.

2. The method of claim 1, further comprising translating a virtual address to the physical address utilizing a global page table or a translation lookaside buffer (TLB).

3. The method of claim 2, wherein the global page table comprises a field indicating that the physical address is to be combined with the global bit.

4. The method of claim 1, wherein each of the one or more memory blocks in each of the plurality of nodes is a fixed size.

5. The method of claim 1, wherein each of the one or more memory blocks in each of the plurality of nodes is block-size aligned.

6. The method of claim 1, wherein a total of the memory in the distributed memory system exceeds a number of physical address bits that can be generated by a common page table mechanism.

7. The method of claim 1, wherein the global bit is cached.

8. The method of claim 1, wherein the global bit specifies a remote node identification and a block offset.

9. The method of claim 8, wherein the global bit further specifies upper address bits.

10. The method of claim 1, further comprising interleaving global virtual addresses.

11. The method of claim 1, further comprising removing the global bit before the addressing of the memory block.

12. A distributed memory system comprising:
    a plurality of nodes, each node of the plurality of nodes comprising memory and an operating system running on the memory, wherein the memory of each node is partitioned into one or more memory blocks available for a global memory pool;
    wherein the operating system comprises instructions which, when executed, cause the operating system to:
        combine, in response to a request to address memory in the global memory pool, a global bit stored in a hardware device with a physical address to generate a global virtual address, wherein the global bit indicates whether the memory is local or remote;
        translate, using global access tuple (GAT) tables, the global virtual address to a global physical address; and
        address a memory block of the one or more memory blocks in the global memory pool based on the global physical address.

13. The distributed memory system of claim 12, wherein the instructions further cause the operating system to translate a virtual address to the physical address utilizing a global page table or a translation lookaside buffer (TLB).

14. The distributed memory system of claim 12, wherein each of the one or more memory blocks in each of the plurality of nodes is a fixed size.

15. The distributed memory system of claim 12, wherein each of the one or more memory blocks in each of the plurality of nodes is block-size aligned.

16. The distributed memory system of claim 12, wherein a total of the memory in the distributed memory system exceeds a number of physical address bits that can be generated by a common page table mechanism.

17. The distributed memory system of claim 12, wherein the global bit specifies a remote node identification and a block offset.

18. The distributed memory system of claim 17, wherein the global bit further specifies upper address bits.

19. The distributed memory system of claim 12, wherein the instructions further cause the operating system to interleave global virtual addresses.

20. The distributed memory system of claim 12, wherein the instructions further cause the operating system to remove the global bit before addressing the memory block.

\* \* \* \* \*